May 7, 1968        L. H. KINCAID        3,381,670

ROTARY INTERNAL COMBUSTION ENGINE

Filed Jan. 31, 1967        6 Sheets-Sheet 1

INVENTOR
LESTER H. KINCAID
Lester H Kincaid

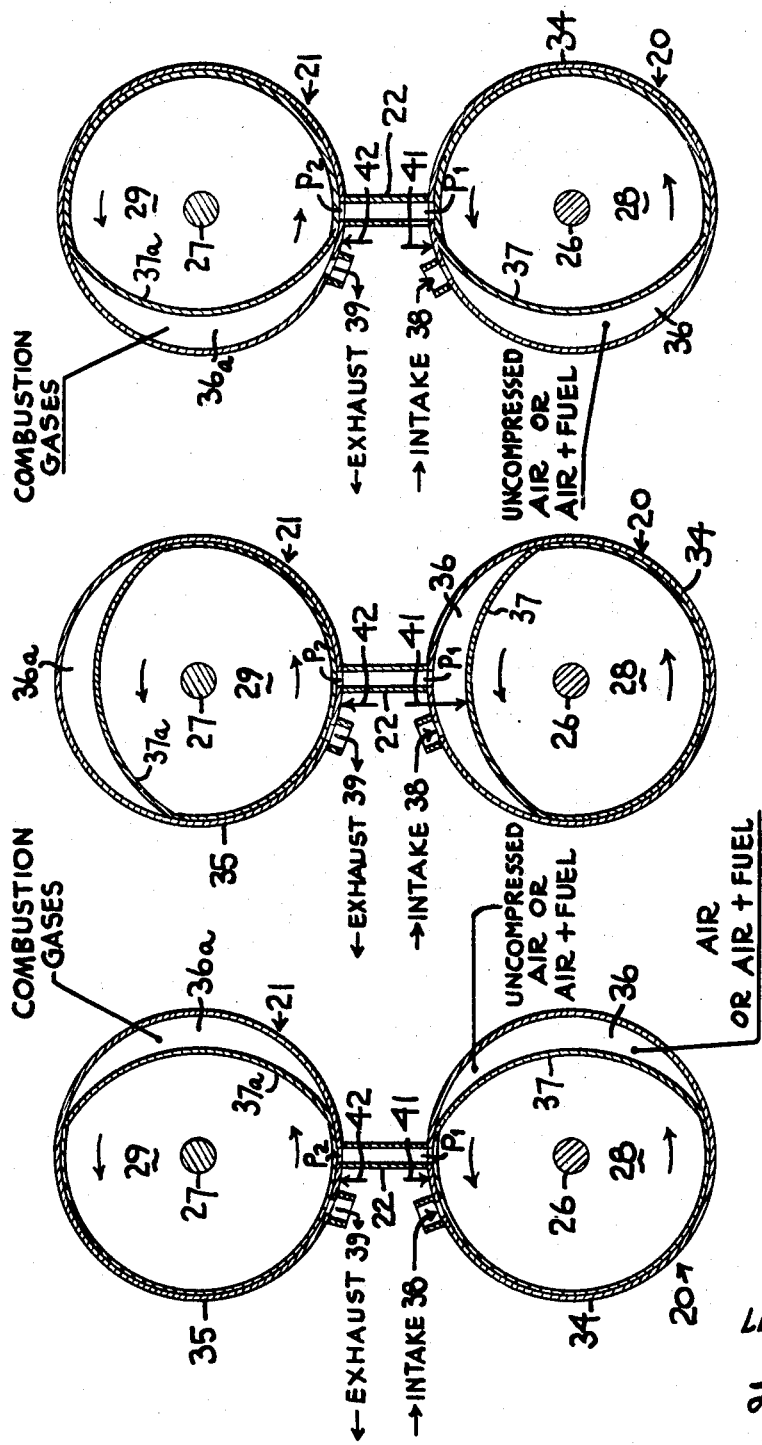

May 7, 1968  L. H. KINCAID  3,381,670
ROTARY INTERNAL COMBUSTION ENGINE
Filed Jan. 31, 1967  6 Sheets-Sheet 3

INVENTOR
LESTER H. KINCAID

Lester H Kincaid

May 7, 1968 L. H. KINCAID 3,381,670
ROTARY INTERNAL COMBUSTION ENGINE
Filed Jan. 31, 1967 6 Sheets-Sheet 4

INVENTOR
LESTER H. KINCAID

Lester H Kincaid

BY

ATTORNEY

May 7, 1968  L. H. KINCAID  3,381,670
ROTARY INTERNAL COMBUSTION ENGINE
Filed Jan. 31, 1967  6 Sheets-Sheet 5

INVENTOR
LESTER H. KINCAID
BY *Lester H Kincaid*
ATTORNEY

United States Patent Office 3,381,670
Patented May 7, 1968

3,381,670
ROTARY INTERNAL COMBUSTION ENGINE
Lester H. Kincaid, 1605R Hebron Road,
Heath, Ohio 43055
Filed Jan. 31, 1967, Ser. No. 612,994
5 Claims. (Cl. 123—14)

ABSTRACT OF THE DISCLOSURE

An engine comprising a rotary pump section for compressing combustion fuel mixture into a combustion chamber, means to ignite the mixture in the chamber, a rotary motor section actuated by gases from the chamber, said sections each having a lobate rotor, the rotors being phased to open and close the ports of the chamber in alternation so that the ignited mixture expands to drive the rotor of the motor section.

Objects of the invention are:

To provide a rotary internal combustion engine wherein both compression and expansion phases occur under positive displacement conditions:

To provide a rotary internal combustion engine wherein relatively high torque is attained even at slower speeds of revolution:

To provide an internal combustion engine wherein a relatively large number of power impulses per power chamber per revolution of the drive shaft are obtained; and To provide an internal combustion engine of simple design wherein unidirectional flow of the burning or burnt mixture is attained.

These and other objects will be evident from the appended specification and claims and/or drawings, wherein:

FIGURES 3, 4 and 5 are sections diagrammatically illustrating phases in the operation of the engine shown in FIGURES 1 and 2.

Figure 1:
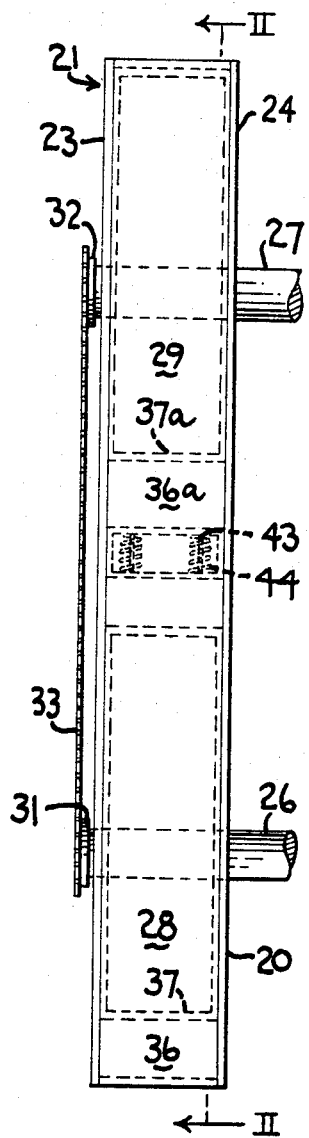
FIGURE 1 is a side elevational view of an engine embodying the construction of this invention.

Internal combustion engines are most commonly of the piston type, that is, they comprise heavy pistons reciprocating in cylinders and being connected by rods to a crank shaft. The parts are heavy and much vibration is generated when the engines are run to generate power. Usually, only one power impulse is obtained for each four movements of a piston. Therefore, many pistons are necessary if a reasonably smooth flow of power is to be obtained.

Gas turbines have been suggested as a substitute for piston engines. These depend upon kinetic energy of a stream of a gas to drive a rotor. The power output is smooth, but at slow speeds or when starting the apparatus, the gases blow past the rotor without doing much work.

In accordance with the present invention, an internal combustion engine which has the virtues of both of the foregoing types without the corresponding disadvantages, is provided.

The new engine comprises a combustion chamber with spaced ports, one being an intake or inlet port, the other being an outlet port. The intake port is joined to a rotary compressor that forces air and fuel into the combustion chamber. The outlet port of the combustion chamber feeds into a unit called a "power unit" which is similar to the compressor, but the parts are arranged to give a power output from the combustion products expanding from the combustion chamber. In order to obtain these results, the compressor unit and the power unit comprise fixed chambers of circular section connected by said ports to the combustion chamber and are provided with rotors having lobes, which are arcs of circles concentric with the chambers and coacting with free abutments. Variable volume chambers are thus provided, that on the compression side being adapted to compress a charge into the combustion chamber; that on the power side being adapted to expand under the impulse of expanding gases from the combustion chamber to give positive displacement. The lobes are so phased with respect to each other that when the inlet port of the combustion chamber is closed, the outlet port is open, and vice versa.

In the form of the invention disclosed in FIGURES 1 to 5, the compression chamber 20 and the power chamber 21 are disposed in side-by-side relationship and are interconnected substantially radially by the combustion chamber 22 having ports P1 and P2 into the first chambers. The sides of the chambers are closed by plates 23 and 24 that provide bearing members for spaced parallel shafts 26 and 27. Shafts 26 and 27, as well as chambers 20 and 21, may be said to have axes vertical to a common plane. The same may be said of constructions later to be described, wherein the chambers are disposed in tandem and the shafts thereof are joined as single units. Rotors 28 and 29, which preferably are hollow, are fixed upon the shafts and are driven in synchronism by a drive train, such as sprockets 31 and 32 (see FIGURE 2), and a chain trained thereabout as indicated by broken lines at 33. These may be replaced by a gear train, if so desired.

The lobes 34 and 35 of the rotors are of radii to fit closely within chambers 20 and 21. When one of these lobes is opposite a port P1 or P2 to the combustion chamber 22, the latter is sealed on that end and pressures generated in the chambers 20 and 21 exert little or no back torque. To provide for pump or motor action, the rotors have cut-away portions defining crescent-like cavities 36 and 36a between the chamber walls and cam-like sections 37 and 37a of the rotors.

Lobes 34 and 35 of the rotors are so phased that when one is passing the contiguous port of the combustion chamber to close the same, the cut-away sector of the other rotor is opposite the port at the other end. Combustible material (e.g., air and fuel) may thus enter at one port P1 and expanding, burning mixture can pass out at the other port P2 to drive the power rotor.

Chamber 20 is also provided wth an inlet port 38 for air or air mixed with fuel for compression into the combustion chamber. An exhaust port 39 is provided for chamber 21. These ports are disposed in contiguity to combustion chamber 22.

Fuel for the system may be mixed with the air before it is introduced through inlet port 38. The fuel may also carry lubricant for the mechanism, as in many well-known engines. Lubricant may also be introduced by other well-known systems (not shown).

In order to make rotors 28 and 29 effective for their function of producing compression of fuel-air mixture or for delivering power from burning mixture, free abutments are provided between the ports of the combustion chamber and the inlet and exhaust ports 38 and 39. The sides of the combustion chamber 22 selected for the inlet or exhaust ports and the attendant free abutments will depend upon the direction of rotation of the rotors 28 and 29. In the compression chamber 20, the rotor will turn from the combustion chamber 22 toward the intake port 38. The rotor 29 in chamber 21 turns toward exhaust port 39. The rotors are shown as turning in the same direction, but one may rotate in opposite direction to the other if the ports are properly placed with respect to the combustion chamber.

The inlet for fresh mixture is on the leading side of the combustion chamber; the exhaust is on the trailing side.

In order to vary the effective volumes of the cavities 36 and 36a, free abutments are provided. The functioning of these is indicated diagrammatically by heavy arrows in FIGURES 3, 4 and 5. A convenient form of abutment is shown in greater detail in FIGURES 1 and 2. Each comprises an abutment or slide (41 for the compression chamber and 42 for the power chamber). Preferably, they are formed to heat-resistant material of good strength and are machined to fit accurately in slots of chambers 20 and 21 and to conform closely to the surfaces of the rotors and said chambers 20 and 21. If desired, they may also be provided with guide rods 43 at their outer ends, which rods are of such length as to permit the abutment elements to move toward or away from each other as the phasing of the rotors change. To this end, the rods may be disposed slidably in bores extending into one or both sides 41 and 42. Springs 44 urge the abutments apart and into continuous engagement with the surfaces of rotors 28 and 29.

The several phases and the transitions involved will be clear from the views in FIGURES 3, 4 and 5. In FIGURE 3, the engine is shown in substantially neutral phase. A power impulse has just been completed in chamber 21 and the cam-like portion 37a has moved beyond the port P2 of the combustion chamber 22. The cavity 36a is filled with expanded combustion products. The free abutment 42 is at the outward limit of its travel and is in contact with the lobe portion 35 of rotor 29. The cavity 36 of rotor 28, filled with fresh air or air and fuel from intake 38, is moving up to the port P1 of the combustion chamber 22. The abutment in chamber 20 is about to leave lobe 34 to follow cam-like portion 37 of rotor 28.

FIGURE 4 shows the parts in intermediate position. The part of cavity 36 at the right is being restricted by the free abutment 41 to fill chamber 22 with compressed mixture. The part of cavity 36 at the left is expanding to take in fresh charge through port 38. The spent charge in cavity 36a is still confined and volume thereof is static.

FIGURE 5 shows the rotors after the rotors have traveled 180 degrees from their positions in FIGURE 3. The cavity 36 is past port P1 of chamber 22 and its charge has been transferred to the latter chamber in readiness for ignition. The cavity 36a in chamber 21 is just moving up to exhaust port 39 and port P2 of combustion chamber 22. The port portion P1 from chamber 20 is now blocked or about to be blocked by rotor lobe 34, thus preventing gases from expanding backward from the cavity 36a as it sweeps past port P2. Therefore, the expanding mixture from chamber 22 forces rotor 29 to the right.

Figure 2:
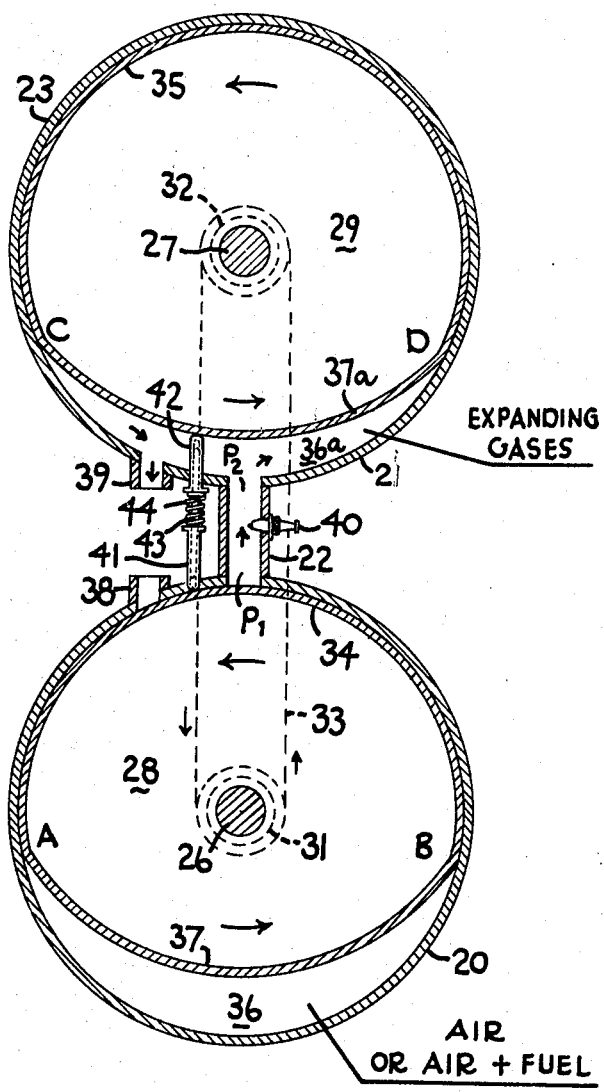
FIGURE 2 is a sectional view taken substantially upon line II—II of FIGURE 1.

The position of the parts in the midpoint of the power phase has already been shown in FIGURE 2 wherein the portion of cavity 36a to the right is being expanded while the portion to the left is being restricted by the free abutment 42 to expel the spent gases. Cavity 36 is about to recharge combustion chamber 22.

It is an advantage of this embodiment and the other embodiments herein disclosed that the gases have essentially unidirectional flow. Compression of the fresh charge in the combustion chamber and recharging of the compressor cavity 36 take place simultaneously. Also, the scavenging of the power cavity 36a occurs concomitantly with the power impulse. This admits of a full power impulse for each passage of the cavity past the combustion chamber. In other embodiments of the invention wherein the number of combustion chambers has been increased, the number of power impulses per revolution of the rotors has been correspondingly increased. A like effect is attainable by increasing the number of lobes and cam-like portions of the rotors.

Substantially any desired compression ratio may be attained in the combustion chamber 22 by changing relative volumes of the combustion chamber and the cavity 36. Chambers 20 and 21 have been shown as being about equal in volume, but this ratio may be changed if desired. For example, the power chamber, or at least the cavity 36a, may be made larger to admit of greater expansion of the combustion products, and a higher yield of power from the fuel. This is an advantage not attainable in a piston type engine without adding gas turbines or other devices to give added useful stages of expansion to the exhaust products. The addition of added stages of expansion by attaching turbines or other power converters to the exhaust 39 is not precluded herein. Superchargers may also be attached to the inlet 38 to increase power output of the engine.

Since the gases are substantially fully confined in cavities of varying volume during compression and ignition, it will be apparent that high propulsive forces are exerted by pressure against power rotor 29 even when the rotors are turning at slow speeds. The compression in chamber 22, like that in a piston type engine, with reasonable limits is also independent for rotor speed and the kinetic energy of the burning mixture.

At the same time, operation is relatively vibration free because of the absence of such reciprocating parts as pistons and connecting rods. Cranks for the drive shaft valves and vlave cams are also eliminated.

The provision of engines wherein the compression chambers and power chambers are arranged in multiples upon common shafts is feasible. By angularly spacing the lobes of the corresponding rotors and the attendant ports and abutments, the number of power impulses can be multiplied, with attendant smoothing out of power input. For example, a compression chamber and a power chamber may be disposed on each shaft and chambers on one shaft may be joined by combustion chambers to those on the other to provide two power impulses for revolution.

Engines wherein the compression chamber and power chamber are disposed upon a single common drive shaft are simple and can be made to give several power impulses per revolution. In these engines, the compression chambers and the power chambers are coaxial and longitudinally spaced. They are interconnected at or near their perimeters by one, two, three, four or even more combustion chambers.

Figure 9:
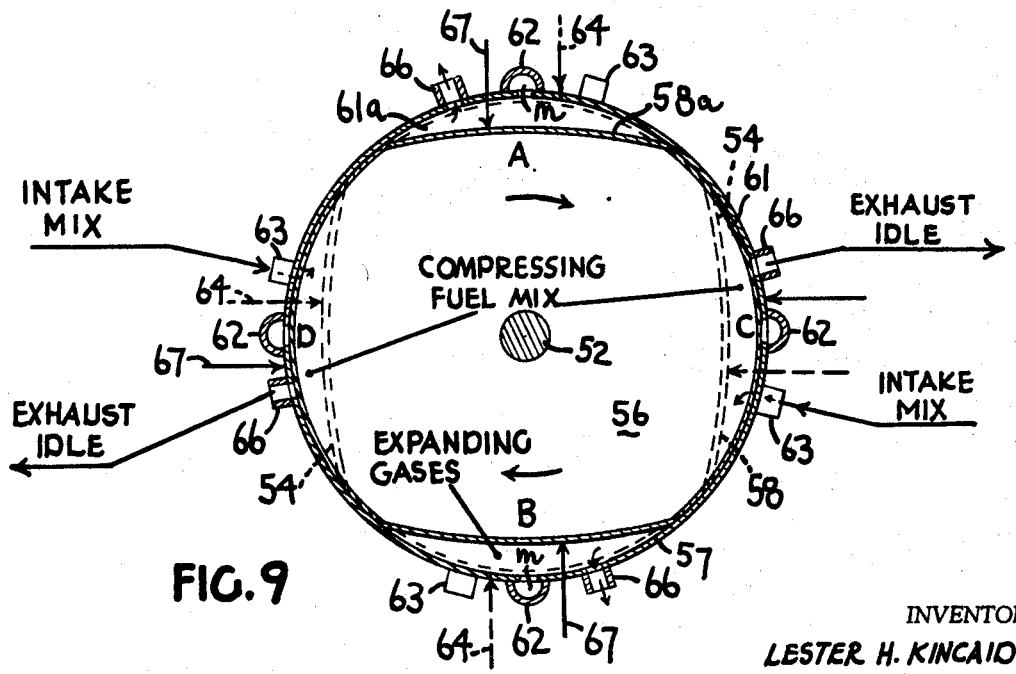
Figure 10:
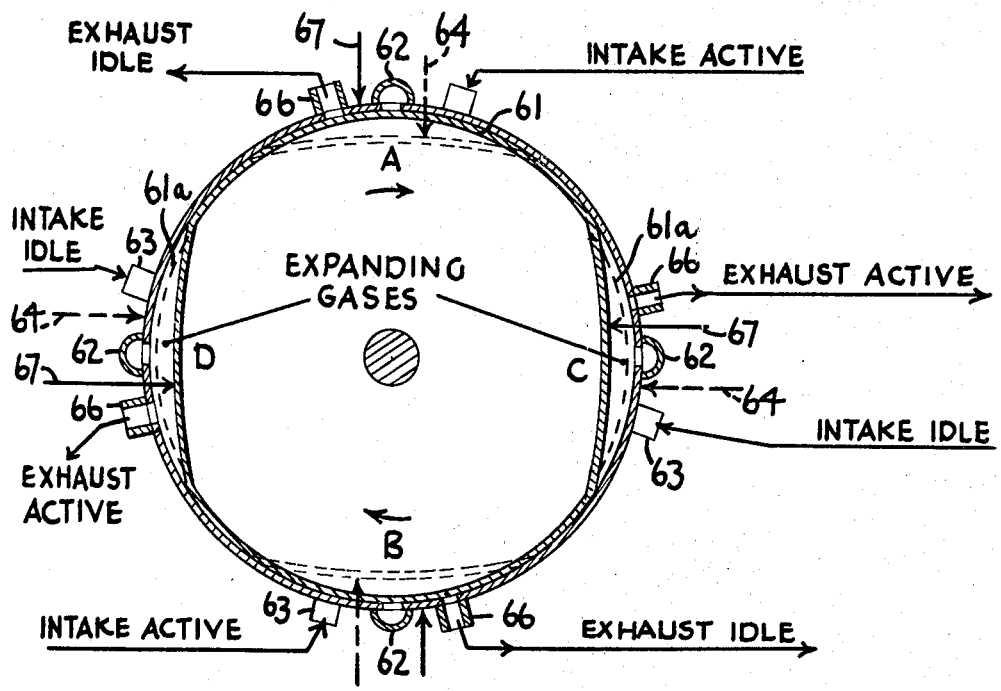
Figure 11:
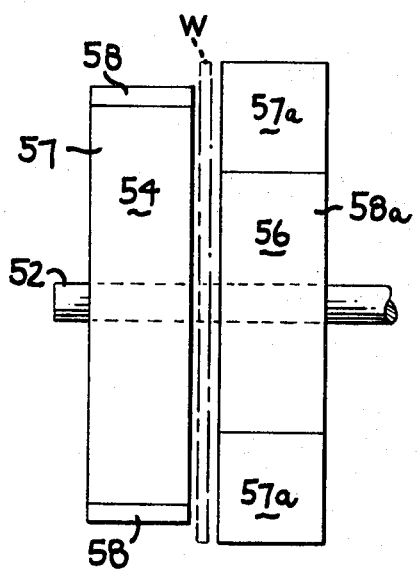
FIGURE 11 is a detail view of the rotor assembly used in the apparatus of FIGURES 6 and 7.

Simplified engines of this type are shown in FIGURES 6 to 14. In the engine of FIGURES 6, 7, 8, 9 and 10, the compression chamber 50 and power chamber 51 contain a coaxially disposed shaft 52 rotating in bearings 53 and 53a in the end walls of the chambers. The axes of the chambers are perpendicular to a common plane. The shaft carriers compression rotor 54 and power rotor 56 fixed thereupon and phased about 90 degrees apart and being disposed in their respective chambers. FIGURE 11 is a detail view of these rotors mounted on shaft 52. They respectively comprise two lobe portions (57 for rotor 54 and 57a for rotor 56) and intermediate cut-away, cam-like portions 58 and 58a that define a pair of crescent-like cavities 61 and 61a for each of chambers 50 and 51.

Chambers 50 and 51 are interconnected at or near their outer perimeters by longitudinally extending combustion chambers 62 which have ports M at their ends opening into the chambers 50 and 51, and provide a passage between the latter chambers. There is a combustion chamber for each lobe and each cam-like portion of a rotor, though this is not strictly necessary as the combustion chambers could be spaced 180 degrees. However, this would halve the number of power impulses per revolution.

Intake ports 63, one for each combustion chamber, are provided in the compression chamber. These are disposed clockwise (i.e., in the direction of rotation of the shaft 52) and are spaced sufficiently from the combustion chambers to permit the installation of spring-actuated free abutments between the chambers and the ports, and being indicated in FIGURES 7 to 10 by heavy dotted arrows 64. As the rotor turns clockwise, the abutments compress the air or air and fuel in cavities 61 into the combustion chambers 62.

Figure 6:
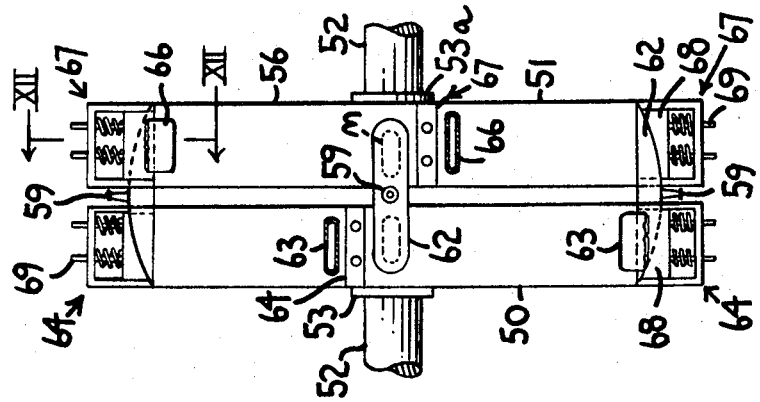
FIGURE 6 is a side elevational view of another embodiment of the invention, but operating upon principles similar to those of the apparatus shown in the preceding figures.
Figure 12:
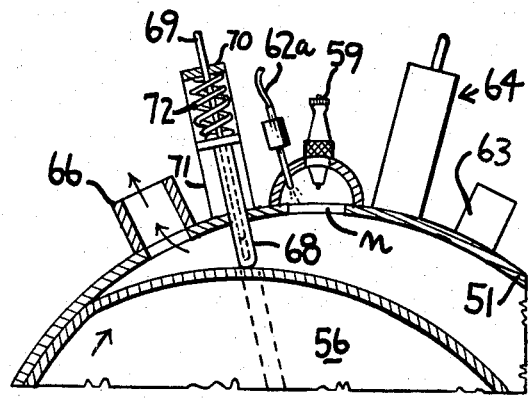
FIGURE 12 is a fragmentary sectional view upon line XII—XII showing upon a larger scale the relationship of the combustion chamber, as well as the free abutments that coact with the rotors to provide variable volume in the engine cavities in the constructions shown in FIGURES 6 and 7.

Prior to ignition, the compressed air or air and fuel are confined in the combustion chambers by the lobe portions 57a of rotor 56, which, are at this time, seeping past the contiguous ports M of the combustion chamber (see FIGURES 6 and 12). As the compression phase is completed, and as the lobe 57a is leaving or about to leave the ports M of the combustion chambers, the mixture in the latter is ignited by timed electrical sparks of plugs 59 or by compression ignition. Timed electrical energy for sparks may be supplied by a conventional ignition mechanis driven by the shaft 52 through appropriate drive train or by other means.

The exhaust ports 66 for the power chamber 56 are disposed in the chamber 51 in counterclockwise and slightly spaced relation to the combustion chambers 62, and the free abutments 67 for the power chamber 51 are disposed between the combustion chambers 62 and the exhaust ports 66, so that ignited mixture expanding into cavities 61a will exert force clockwise to drive the rotor 51 in the same direction. As power is being delivered on the clockwise side of the combustion chamber 62 the spent gas back of or on the counterclockwise side of the free abutments 67 is being swept or scavenged through the exhaust ports 66.

Figure 7:
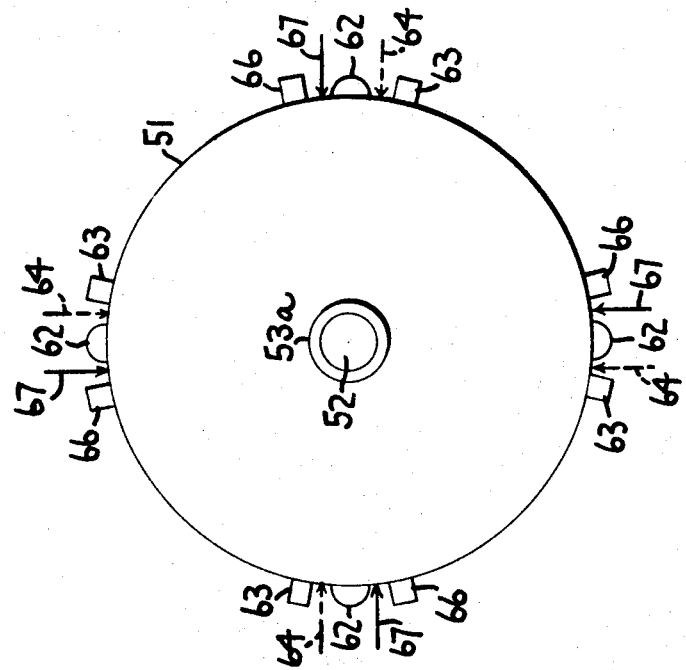
FIGURE 7 is a front elevational view of the construction shown in FIGURE 6, but with certain free abutment elements indicated by arrows in order to simplify and clarify the showing.
Figure 8:
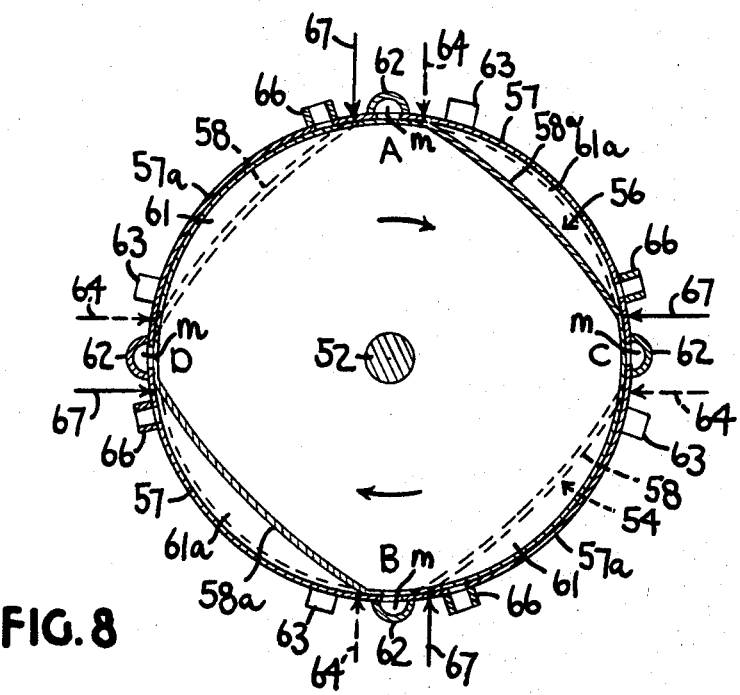
FIGURES 8, 9 and 10 are sections diagrammatically illustrating the apparatus shown in FIGURES 6 and 7.

In FIGURES 8, 9 and 10, the engine of FIGURES 6 and 7 is shown diagrammatically as passing through its phases in operation. In FIGURE 8, the rotors 54–56 are in substantially neutral phase wherein all of the free abutments in both chambers 50 and 51 are retracted or idle. Cavities 61a are filled with combustion products. The same is also true of combustion chambers 62. Cavities 61 in the compression chamber are charged with uncompressed air or air and fuel. The zones wherein the combustion chambers, the several free abutments and ports are located have been designated A, B, C and D. Zones A and B, 180 degrees apart, are alike in that a power impulse has just been completed and cavities 61 of rotor 54 are just moving up to recharge the combustion chambers 62. Zones C and D are spaced the same way and are alike in phase in that cavities 61 have just been recharged and are about to transfer their charges to the combustion chambers 62. During the latter operation, ports M from the combustion chambers in zones C and D will be closed by the lobes of power rotor 56.

FIGURE 9 shows the condition of the parts when the charges at A and B have been ignited and a power impulse is in mid-progress. The combustion chambers 62 at C and D are being recharged for the next power impulse from these zones.

FIGURE 10 shows the succeeding stage wherein the rotors have been advanced 90 degrees and power is being delivered at zones C and D, and the combustion chambers at A and B are being recharged for the next power impulse. The leading sides of cavities 61a are being driven clockwise by expanding combustion gases. The other side is being scavenged.

In FIGURES 6 and 12 are shown simplified embodiments of free abutment mechanism (heretofore shown by arrows 64 and 67) for effecting the contraction and expansion of the volumes of the cavities in chambers 50 and 51 either to compress mixture into combustion chamber 62 or to derive power from the burning mixture. Each free abutment comprises a slide element fitting closely within a slot in a perimeter of one of the chambers 50 and 51, and engaging slidably and closely at its inner end with the perimeter of a rotor 54 or 56 as the case may be. In FIGURE 12, the slide is indicated at 68 and reciprocates at appropriate angle, e.g., approximately radially in a cylindrical side of a chamber, e.g., 51. It may also be provided with rigid guide rods 69 reciprocating in holes in the bight portions 70 of U-shaped yokes 71 upon the chambers 50 and 51. Springs 72 are disposed upon the rods between the outer ends of slide elements 68 and bights 70 to urge the inner ends of the slides into engagement with the rotors as they revolve, thus providing a seal between the rotor and the inner edges of the slide elements.

The engines of FIGURES 6, 7, 8, 9 and 10 have two lobes which are parts of cylinders and two cam-like portions on each rotor. The power chamber has four combustion chambers. Each lobe portion receives four power impulses per revolution or a total of eight for the two lobes. This is the same number as is delivered by sixteen cylinders in a four-cycle engine of conventional design. Moreover, the impulses are paired and counterbalance each other, thus producing very little vibration.

If desired, as shown in FIGURE 12, grooves 68a may be formed in the ends of the compression and power chambers to receive projecting edges of the free abutment slides, thus giving them greater strength and rigidity and more positively guiding their movements.

Injectors 62a may be installed to inject fuel at an appropriate stage into the combustion chambers 62. This, however, is an alternative since the fuel may be contained in the intake air from ports 63.

Injection may be timed to obtain combustion at any desired stage of the compression cycle. Also, it is not precluded to inject fuel into the air in chamber 51 to give combustion at that stage rather than in chamber 62.

Lubricant for the system may also be included in the injected fuel or sprayed from time to time into the air of intake.

In FIGURES 6 to 14, the compression chambers and power chambers have been illustrated as being separate. It is also possible to combine these in a single chamber wherein division for the two functions of compression and delivery of power is attained by a fin or rib on the cam-like portion of a rotor to provide circular section to separate the two ends of the chamber. A washer-like disc between the rotors could also be used for a like purpose. Such member is shown in dot and dash line at W in FIGURE 11.

Figure 13:
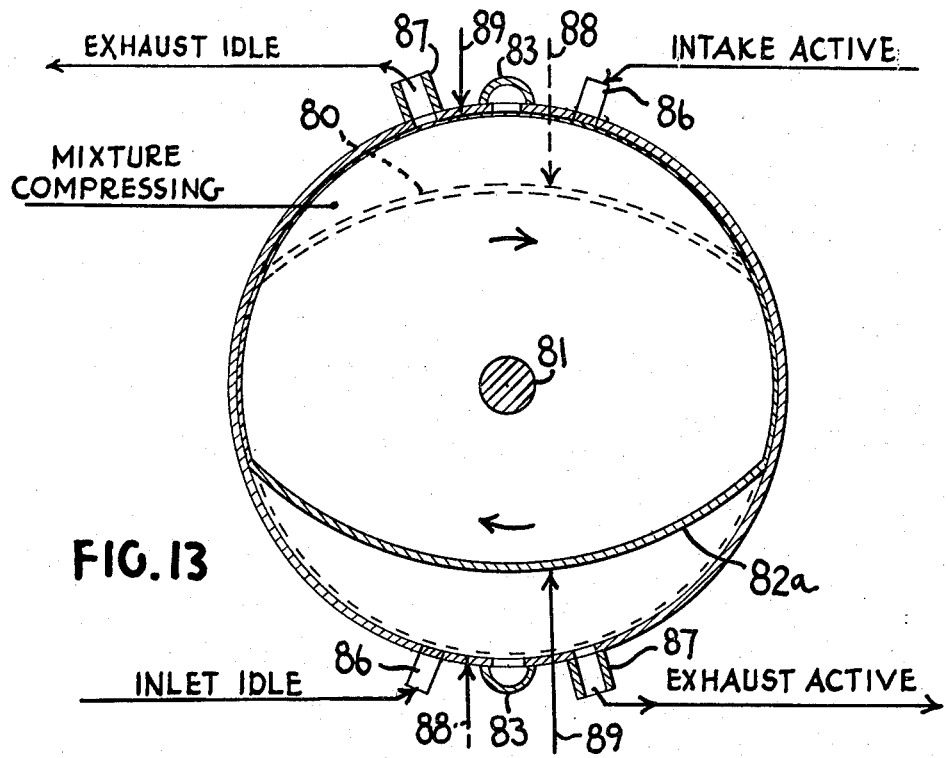
FIGURES 13 and 14 are respectively a sectional view looking axially, and a sectional view at right angles of a slight simplification of the apparatus shown in FIGURES 6 to 10.
Figure 14:
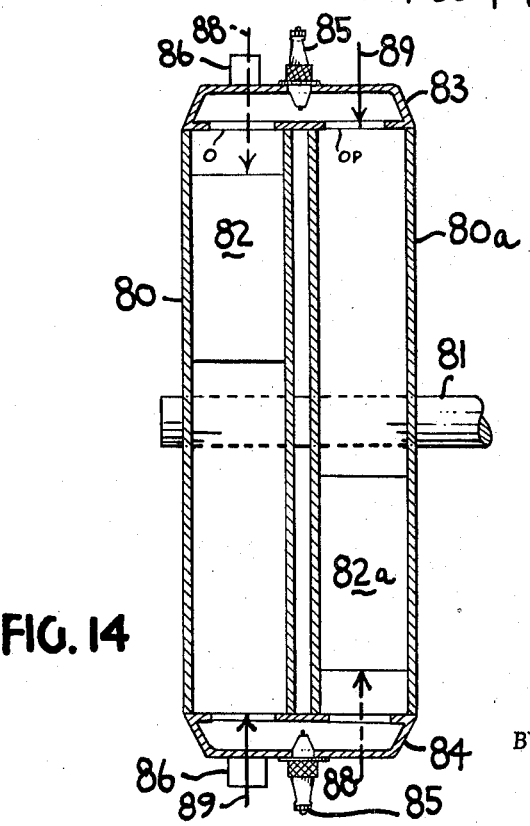

In FIGURES 13 and 14 is shown an engine which has two rotors with single approximately semicircular lobes and being fixed upon a single shaft as in FIGURES 6 to 10. It provides two power impulses per revolution, which is the same number as given by a four-cylinder, four-cycle piston engine. Like the others herein it provides positive displacement in change of volume of gases, as the rotors revolve. The stationary compression and power chambers, respectively 80 and 80a, are provided with a single coaxial shaft 81 upon which are fixed oppositely phased compression rotor 82 and power rotor 82a. Two peripheral combustion chambers 83 and 84 have inlet ports O and outlet ports OP (FIGURE 14), establishing communications between chambers 80 and 80a. Spark plugs 85 are also provided in the combustion chambers 83 and 84. Inlet ports 86 are provided in chamber 80 on the clock-wise side of chamber 83 and exhaust ports 87 are provided on the counterclockwise side of the same combustion chamber 83. Free abutments 88 for the compression chambers 80 and 89 for the power chamber 80a are disposed between the combustion chambers 83 and the ports 86 and 87. For the sake of simplicity and clarity, the free abutments are again indicated diagrammatically by arrows.

This engine has great simplicity and yet provides torque throughout most of the revolution. Its mode of operation will be apparent by reference to the description of the operation of the engine of FIGURES 6 to 12. Fewer lobes on the rotors are present and there has been a concomitant reduction of the number of combustion chambers and free abutments, but the operation of those remaining are the same as those described in the somewhat more complicated embodiment of FIGURES 6 and 12. Where great uniformity of torque is not required, the simpler mechanism will be adequate.

It has previously been indicated that these engines give a high ratio of power impulses per revolution of the power shaft. Reciprocatory parts are few in number and light in weight. Therefore, vibration is low. Also, a crank shaft is not required. These and other features distinguish the engines from conventional piston engines.

In the engines herein disclosed, gases are positively compressed before ignition and are positively expanded after ignition in chambers of variable volume. Good drive shaft torque for starting, acceleration, or taking up sudden loads is attainable. This is in marked contrast to a gas turbine wherein the rotor is driven by the kinetic energy of the combustion products, which is not very effective when the apparatus being driven is often idle or subject to variations of load.

The engines herein disclosed are capable of many uses, as for instance, driving automotive vehicles, aircraft, boats, electrical generators, pumps, and machinery in general.

According to the provisions of the patent statutes, there are described above the invention and what are now considered to be its best embodiments. However, within the scope of the appended claims, it is to be understood that the invention can be practiced otherwise than as specifically described.

I claim:
1. A rotary internal combustion engine comprising a pair of cylindrical chambers disposed with axes substantially vertical to a common plane, one of said pair of chambers being a compression chamber and the other being a power chamber, a combustion chamber interconnecting said pair of chambers at about the outer peripheries thereof; synchronized rotors disposed in said pair of chambers, the rotors having lobes engaging the cylindrical walls of the chambers, and cam-like portions spaced from said walls to form peripherally extending cavities; the compression chamber having an inlet port for air disposed at its outer periphery on the leading side of the combustion chamber; the power chamber having an exhaust port for combustion products disposed at the outer perimeter thereof contiguous to the trailing side of the combustion chamber, and a free abutment in each of said pair of chambers between said ports and the combustion chamber; the lobe of one rotor being phased to cover the contiguous end of the combustion chamber while the other end of the latter is open into a cavity of the other chamber, whereby, as the rotors are actuated, a mixture of air and fuel is compressed into the combustion chamber and then burning products of the mixture are expanded into the power chamber.

2. The rotary internal combustion engine as defined in claim 1 wherein the rotors of the compression chamber and the power chamber are fixedly secured upon separate synchronized parallel shafts and the two chambers are approximately radially interconnected by the combustion chamber.

3. The rotary internal combustion engine as defined in claim 1 wherein the rotors are fixedly secured in tandem upon a common shaft.

4. The rotary internal combustion engine as defined in claim 1 wherein the compression chamber and the power chamber are interconnected by a plurality of combustion chambers spaced equal to the sum of the number of the cam-like portions and the lobe portions of a rotor.

5. The rotary internal combustion engine as defined in claim 1 wherein each rotor has a pair of lobes and a like number of cam-like portions and there is a combustion chamber for each.

References Cited

UNITED STATES PATENTS 2,158,532  5/1939  Bullen.

FOREIGN PATENTS 573,247  6/1924  France.

RALPH D. BLAKESLEE, *Primary Examiner.*